United States Patent  [15] 3,682,962
Dickinson  [45] Aug. 8, 1972

[54] 1-SUBSTITUTED-1,2,3,5-TETRAHYDRO-4,1-BENZOTHIOZEPINES

[72] Inventor: William B. Dickinson, Colonie, N.Y.

[73] Assignee: Sterling Drug Inc., New York, N.Y.

[22] Filed: March 17, 1970

[21] Appl. No.: 20,436

[52] U.S. Cl. ...260/327 B, 260/453 AL, 260/453 AR, 260/454, 260/516, 260/612 D, 260/646, 424/275
[51] Int. Cl. .......................A61k 27/00, C07d 93/40
[58] Field of Search ...................................260/327 B

[56] References Cited

UNITED STATES PATENTS

| | | | |
|---|---|---|---|
| 3,361,750 | 1/1968 | Krapcho | 260/268 |
| 3,029,251 | 4/1962 | Fancher et al. | 260/327 |
| 3,400,119 | 9/1968 | Wenner et al. | 260/239.3 |
| 3,395,150 | 7/1968 | Krapcho | 260/268 |
| 3,362,962 | 1/1968 | Reeder et al. | 260/294.8 |

OTHER PUBLICATIONS

Smith, Open– Chain Nitrogen Compounds, Vol. II (Benjamin, N.Y., 1966) p. 145.
Mushkalo et al., Chem. Abs. 50:366 (1956).

*Primary Examiner*—Henry R. Jiles
*Assistant Examiner*—Cecilia M. Shurko
*Attorney*—Elmer J. Lawson, B. Woodrow Wyatt, Thomas L. Johnson, Robert K. Bair, William G. Webb and Roger T. Wolfe

[57]  ABSTRACT

1-(Substituted)-(6,7,8 or 9)-(substituted or unsubstituted)-1,2,3,5-tetrahydro-4,1-benzothiazepines, derived from the corresponding (6,7,8 or 9)-(substituted or unsubstituted)-1,2,3,5-tetrahydro-4,1-benzothiazepines by 1-acylation, 1,1'-bisacylation, 1-carbamylation or 1-thiocarbamylation followed optionally by 4-oxidation or by 1-nitrosation followed by reduction, have anticonvulsant activity and are useful as sedatives.

41 Claims, No Drawings

1-SUBSTITUTED-1,2,3,5-TETRAHYDRO-4,1-BENZOTHIOZEPINES

This invention relates to new and useful compositions of matter classified in the art of chemistry as 1,2,3,5-tetrahydro-4,1-benzothiazepines and to processes for their preparation.

In one of its composition of matter aspects my invention provides (6,7,8 or 9)-(Q)-1-(X)-4-($O_n$)-1,2,3,5-tetrahydro-4,1-benzothiazepine of the formula

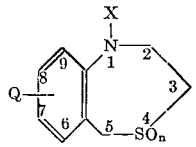

(Formula I)

where Q is hydrogen, halo, atertiary alkoxy of one to four carbon atoms or trifluoromethyl; X is alkanoyl of one to five carbon atoms, cycloalkanecarbonyl of three to six ring carbon atoms, benzoyl, benzoyl substituted by one to three members of the group consisting of methyl, trifluoromethyl, halo, methoxy, acetamido, dimethylamino, nitro, and methylsulfonyl, phenylalkanoyl of eight to ten carbon atoms, diphenylalkanoyl of fourteen to sixteen carbon atoms, atertiary perfluoroalkan-oyl of two to five carbon atoms, haloacetyl, dihaloacetyl, pentachloro-2,4-pentadienoyl or $\alpha,\alpha$-diphenyl-$\alpha$-chloroacetyl; and n is zero, one or two.

In another of its composition of matter aspects my invention provides 1,1'-(X)-bis[(6,7,8 or 9)-(Q)-4-($O_n$)-1,2,3,5-tetrahydro-4,1-benzothiazepine] of the formula

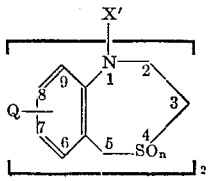

(Formula II)

where Q is hydrogen, halo, atertiary alkoxy of one to four carbon atoms or trifluoromethyl; X' is alkanedioyl of three to six chain carbon atoms, perfluorosuccinyl or perfluoroglutaryl; and n is 0, 1 or 2.

In still another of its composition of matter aspects my invention provides (6,7,8 or 9)-(Q)-1-(Y)-4-($O_n$)-1,2,3,5-tetrahydro-4,1-benzothiazepine of the formula

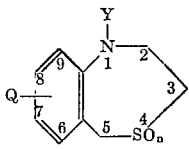

(Formula III)

where Q is hydrogen, halo, atertiary alkoxy of one to four carbon atoms or trifluoromethyl; Y is carbamyl, thiocarbamyl, N-alkylcarbamyl or N-alkylthiocarbamyl of two to five carbon atoms, N-phenylcarbamyl, N-phenylthiocarbamyl or N-phenyl-carbamyl or N-phenylthiocarbamyl substituted in the benzene ring by one to three members of the group consisting of methyl, trifluoromethyl, halo, methoxy, acetamido, nitro and methyl-mercapto; and n is 0, 1 or 2.

In yet another of its composition of matter aspects my invention provides (6,7,8 or 9)-(Q)-1-(Z)-1,2,3,5-tetrahydro-4,1-benzothiazepine of the formula

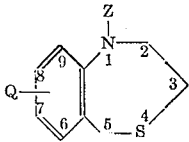

(Formula IV)

where Q is hydrogen, halo, atertiary alkoxy of one to four carbon atoms or trifluoromethyl; and Z is nitroso or amino.

The compounds of Formulas I, II, III and IV have anticonvulsant activity and are useful as sedatives.

In one of its process aspects the invention provides the process for producing (6,7,8 or 9)-(Q)-1-(X)-1,2,3,5-tetrahydro-4,1-benzothiazepine of Formula I, where n is zero, which comprises 1-acylating (6,7,8 or 9)-(Q)-1,2,3,5-tetrahydro-4,1-benzothiazepine of the formula

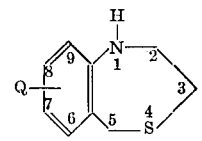

(Formula V).

In another of its process aspects the invention provides the process for producing 1,1'-(X)-bis[(6,7,8 or 9)-(Q)-1,2,3,5-tetrahydro-4,1-benzothiazepine] of Formula II, where n is 0, which comprises 1,1'-bisacylating (6,7,8 or 9)-(Q)-1,2,3,5-tetrahydro-4,1-benzothiazepine of Formula V.

In still another of its process aspects the invention provides the process for producing (6,7,8 or 9)-(Q)-1-(Y)-1,2,3,5-tetrahydro-4,1-benzothiazepine of Formula III, where n is zero, which comprises 1-carbamylating or 1-thiocarbamylating (6,7,8 or 9)-(Q)-1,2,3,5-tetrahydro-4,1-benzothiazepine of Formula V.

In yet another of its process aspects the invention provides the process for producing (6,7,8 or 9)-(Q)-1-(X)-4-($O_n$)-1,2,3,5-tetrahydro-4,1-benzothiazepine of Formula I, where n is one or two, which comprises oxidizing (6,7,8 or 9)-(Q)-1-(X)-1,2,3,5-tetrahydro-4,1-benzothiazepine of Formula I, where n is 0.

In a further process aspect the invention provides the process for producing 1,1'-(X')-bis[(6,7,8 or 9)-(Q)-4-($O_n$)-1,2,3,5-tetrahydro-4,1-benzothiazepine] of Formula II, where n is one or two, which comprises oxidizing 1,1'-(X')-bis[(6,7,8 or 9)-(Q)-1,2,3,5-tetrahydro-4,1-benzothiazepine] of Formula II, where n is 0.

In still a further process aspect the invention provides the process for producing (6,7,8 or 9)-(Q)-1-(Y)-4-($O_n$)-1,2,3,5-tetrahydro-4,1-benzothiazepine of Formula III, where n is 1 or 2, which comprises oxidizing (6,7,8 or 9)-(Q)-1-(Y)-1,2,3,5-tetrahydro-4,1-benzothiazepine of Formula III, where n is 0.

In yet a further process aspect the invention provides the process for producing (6,7,8 9)-(Q)-1-nitroso-1,2,3,5-tetrahydro-4,1-benzothiazepine of Formula IV, where Z is nitroso, which comprises nitrosating (6,7,8 or 9)-(Q)-1,2,3,5-tetrahydro-4,1-benzothiazepine of Formula V.

Finally, the invention provides the process for producing (6,7,8 or 9)-(Q)-1-amino-1,2,3,5-tetrahydro-4,1-benzothiazepine of Formula IV, where Z is amino, which comprises reducing (6,7,8 or 9)-(Q)-1-nitroso-1,2,3,5-tetrahydro-4,1-benzothiazepine.

When Q of Formulas I–V is halo, halo can be fluoro, chloro, bromo or iodo. When Q is atertiary (that is, non-tertiary) alkoxy of one to four carbon atoms, it is methoxy, ethoxy, propoxy, isopropoxy, butoxy, isobutoxy or sec-butoxy. The substituent Q can be at any one of the 6,7,8 or 9-positions.

When X of Formula I is alkanoyl of one to five carbon atoms, it is formyl, acetyl, propionyl, butyryl, isobutyryl, valeryl, isovaleryl, α-methylbutyryl or pivalyl.

When X of Formula I is cycloalkanecarbonyl of three to six ring carbon atoms, it is cyclopropanecarbonyl, cyclobutanecarbonyl, cyclopentanecarbonyl or cyclohexanecarbonyl. The cycloalkane ring can be substituted by one to three of methyl, ethyl and propyl.

When X of Formula I is benzoyl substituted by halo, halo can be fluoro, chloro, bromo or iodo.

When X of Formula I is phenylalkanoyl of eight to 10 carbon atoms it is α-phenylacetyl, α-phenylpropionyl, β-phenylpropionyl, α-phenylbutyryl, β-phenylbutyryl or γ-phenyl-butyryl.

When X of Formula I is diphenylalkanoyl of 14 to 16 carbon atoms, it is α,α-diphenylacetyl, α,α-diphenylpropionyl, α,β-diphenylpropionyl, β,β-diphenylpropionyl, α,α-diphenylbutyryl, α,β-diphenylbutyryl, α, γ-diphenylbutyryl, β,β-diphenylbutyryl, β,γ-diphenylbutyryl or γ,γ-diphenyl-butyryl.

When X of Formula I is atertiary perfluoroalkanoyl of two to five carbon atoms, it is trifluoroacetyl, pentafluoropropionyl, heptafluorobutyryl, heptafluoroisobutyryl, nonafluorovaleryl, nonafluoroisovaleryl or α-trifluoromethylhexafluorobutyryl.

When X of Formula I is haloacetyl or dihaloacetyl, halo can be fluoro, chloro, bromo or iodo.

When X' of Formula II is alkanedioyl of three to six chain carbon atoms, it is malonyl, succinyl, glutaryl or adipyl. The alkylene portions can be substituted by one to four of methyl, ethyl or propyl.

When Y of Formula III is N-alkylcarbamyl or N-alkylthiocarbamyl of two to five carbon atoms, alkyl is methyl, ethyl, propyl, isopropyl, butyl, isobutyl, secbutyl or tertiary butyl. When Y of Formula III is N-phenylcarbamyl or N-phenylthiocarbamyl substituted in the benzene ring by halo, halo is fluoro, chloro, bromo or iodo.

The manner and process of making and using the invention and the best mode of carrying it out will now be described so as to enable any person skilled in the art to which it pertains to make and use it.

The preferred method for the preparation of the (6,7,8 or 9)-(Q)-1-(X)-1,2,3,5-tetrahydro-4,1-benzothiazepines of Formula I and the 1,1'-(X)-bis[(6,7,8 or 9)-(Q)-4-(O$_n$)-1,2,3,5-tetrahydro-4,1-benzothiazepines of Formula II, where $n$ is 0, by 1-acylation of the corresponding (6,7,8 or 9)-(Q)-1,2,3,5-tetrahydro-4,1-benzothiazepines of Formula V is the use of a solvent inert under the reaction conditions, for example, benzene, chloroform, dioxane, tetrahydrofuran or N,N-dimethylformamide and an acid acceptor, for example, triethylamine or pyridine, at a temperature in the range of −20°–120°C.

For the 1-formylation of the compounds of Formula V, the preferred reagent is a mixture of formic acid and acetic anhydride. Alternatively, formic acid alone can be used. For 1-acylation other than 1-formylation, either the acyl chloride or the acid anhydride can be used. For 1,1'-bisacylation the preferred reagent is the diacyl dichloride.

The acyl chlorides, acid anhydrides, diacyl dichlorides and their corresponding acids are known classes of compounds. Many of these acylating agents are commercially available. Those which are not commercially available can be prepared from the corresponding acids by treatment with, for example, thionyl chloride or phosphorous pentachloride.

Preparation of the (6,7,8 or 9)-(Q)-1-(Y)-1,2,3,5-tetrahydro-4,1-benzothiazepines of Formula III, where Y is carbamyl or thiocarbamyl and $n$ is 0, is preferably accomplished by heating the corresponding (6,7,8 or 9)-(Q)-1,2,3,5-tetrahydro-4,1-benzothiazepine of Formula V with an alkali metal cyanate or thiocyanate, for example, potassium cyanate or sodium thiocyanate, in glacial acetic acid as the solvent at a temperature in the range of 40°–110°C. A cosolvent inert under the reaction conditions, for example, dioxane, tetrahydrofuran or N,N'-di-methylformamide, can be used.

For the preparation of the compounds of Formula III, where Y is N-alkylcarbamyl, N-alkylthiocarbamyl, N-phenylcarbamyl, N-phenylthiocarbamyl, N-(substituted-phenyl)carbamyl or N-(substituted-phenyl)thiocarbamyl, the preferred method is heating the corresponding compound of Formula V and an alkylisocyanate, an alkylisothiocyanate, phenylisocyanate, phenylisothiocyanate, a (substituted-phenyl)isocyanate or a (substituted-phenyl)isothiocyanate, respectively, in a solvent inert under the reaction conditions, for example benzene, chloroform, dioxane, tetrahydrofuran or N,N-dimethylformamide at a temperature in the range of 40°–110°C.

Phenylisocyanate and phenylisothiocyanate are known compounds and both are commercially available. The alkylisocyanates, alkylisothiocyanates, (substituted-phenyl)isocyanates and (substituted-phenyl)isothiocyanates are known classes of compounds, some of which are commercially available. Those alkylisocyanates which are not commercially available can be prepared, for example, by the reaction of the corresponding alkyl bromides and silver cyanate. Those alkylisothiocyanates which are not commercially available can be prepared, for example, by the reaction of the adducts of the corresponding alkylamines and carbon disulfide with mercuric chloride. Those (substituted-phenyl)isocyanates which are not commercially available can be prepared, for example, by passing carbonyl chloride into hot solutions of the corresponding anilines in toluene, saturated with hydrogen chloride. Those (substituted-phenyl)isothiocyanates which are not commercially available can be prepared, for example, by treating the corresponding ammonium (substituted-phenyl)dithiocarbamates, prepared in turn from the corresponding substituted anilines and ammonia, with lead nitrate.

Oxidation at the sulfur atom of the compounds of Formulas I, II and III, where n is zero, to prepare the corresponding compounds where n is one, is preferably effected in one of two ways. One way is to employ one molar equivalent quantity (two for the compounds of Formula II) of hydrogen peroxide as the oxidant and acetic acid as the solvent and to maintain the reaction at a temperature in the range of 0°–70°C. The other way is to use an excess of hydrogen peroxide and a solvent mixture comprising acetone, acetic acid and water at a temperature in the range of 0°–70°C.

The preferred method for oxidation at the sulfur atom of the compounds of Formulas I, II and III, where n is zero, to prepare the compounds where n is two, is the use of an excess of hydrogen peroxide as the oxidant in acetic acid as the solvent at a temperature in the range of 50°–110°C.

The preferred method for preparing the (6,7,8 or 9)-(Q)-1-(Z)-1,2,3,5-tetrahydro-4,1-benzothiazepines of Formula IV, where Z is nitroso, is nitrosation of the corresponding (6,7,8 or 9)-(Q)-1,2,3,5-tetrahydro-4,1-benzothiazepines of Formula V with an alkali metal nitrite, for example, sodium nitrite or potassium nitrite, in dilute aqueous solution with a non-oxidizing mineral acid, for example, hydrochloric acid, as the solvent.

Reduction of the 1-nitroso group of the resulting product is preferably achieved using a metal or a mixed metal hydride, for example, lithium aluminum hydride, in an ethereal solvent, for example, tetrahydrofuran, and provides the 6,7,8 or 9)-(Q)-1-(Z)-1,2,3,5-tetrahydro-4,1-benzothiazepines of Formula IV, where Z is amino.

Acid addition salts of the (6,7,8 or 9)-(Q)-1-(Z)-1,2,3,5-tetrahydro-4,1-benzothiazepines of Formula IV, where Z is amino can be prepared with any pharmaceutically acceptable inorganic (mineral) or organic acid. If inorganic it can be, for example, hydrochloric acid, hydrobromic acid, nitric acid, phosphoric acid, sulfuric acid or sulfamic acid. If organic it can be, for example, acetic acid, glycolic acid, lactic acid, quinic acid, hydrocinnamic acid, succinic acid, tartaric acid, citric acid, methanesulfonic acid or benzenesulfonic acid.

For the pharmaceutical purposes of this invention the free base forms of the compounds of Formula IV, where Z is amino, and their corresponding acid addition salts are considered to be equivalent. That the protonic acid be pharmaceutically acceptable means that the beneficial properties inherent in the free base not be vitiated by side effects ascribable to the anions.

Although pharmaceutically acceptable salts are preferred, all acid addition salts are within the scope of the invention. A pharmaceutically unacceptable salt may be useful, for example, for purposes of identification or purification or in preparing a pharmaceutically acceptable salt by ion exchange procedures.

The compounds of Formulas I–IV of this invention are crystalline compounds and are purified by recrystallization. Their structures follow from their route of synthesis and are corroborated by infrared spectral analysis and by the correspondence of calculated and found values of elemental analysis of representative samples. The compounds of Formula I and the intermediates, when crystalline, are characterized by their melting points (m.p.).

As stated hereinabove the compounds of Formulas I–IV of my invention have anticonvulsant activity and are useful as sedatives. This activity is demonstrated in mice as follows. Groups of ten mice each are medicated (10 and 100 milligrams of base per kilogram intraperitoneally or orally) at thirty and ninety minutes prior to rapid intravenous administration of pentalenetetrazole (50 milligrams per kilogram). Animals are considered protected if the test drug prevents the appearance of the hindleg tonic extension component of the seizure. Compounds significantly active at the higher dose level are tested at several doses in order to calculate graphically the dose at which fifty percent of the mice would be protected. This calculated dose is called the $ED_{50}$. Sodium phenobarbital, the reference compound in this test and a drug useful as a sedative in human and veterinary medicine, has an intraperitoneal 30-minute $ED_{50}$ value of 6.0 milligrams per kilogram, an intraperitoneal 90-minute $ED_{50}$ value of 3.6 milligrams per kilogram, an oral 30-minute $ED_{50}$ value of 6.0 milligrams per kilogram and an oral 90-minute $ED_{50}$ value of 8.4 milligrams per kilogram.

The preparation of the intermediate (6,7,8 or 9)-(Q)-1,2,3,5-tetrahydro-4,1-benzothiazepines of Formula V will now be described. In Formula V and in Formulas VI–XII which follow, Q has the meanings ascribed to it hereinabove in Formulas I–IV. The compounds of Formula II are old as a class and are prepared as generally disclosed in U.S. Pats. Nos. 3,400,119 and 3,463,774. The synthesis to be described is similar to that described therein.

This synthesis requires as starting materials the (3,4,5 or 6)-(Q)-2-nitrotoluenes of the formula

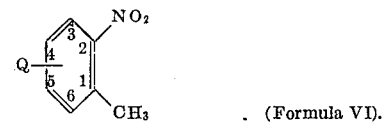

(Formula VI).

Those (3,4,5 or 6)-(Q)-2-nitrotoluenes of Formula VI in which Q is alkoxy of one to four carbon atoms are prepared from the corresponding nitrocresols of the formula

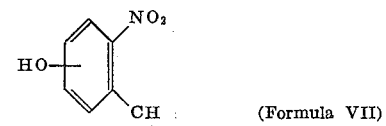

(Formula VII)

for example, by treating the silver salt, of the nitrocresol with the appropriate alkyl iodide or alkyl bromide, for example, methyl iodide or isopropyl bromide.

Those (3,4,5 or 6)-(Q)-2-nitrotoluenes of Formula VI in which Q is trifluoromethyl are prepared from the corresponding nitrotoluic acids of the formula

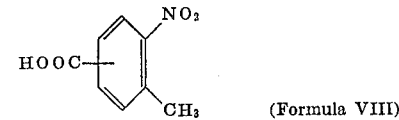

(Formula VIII)

by heating them with sulfur tetrafluoride at 100°–200 °C. under pressure.

The (3,4,5 or 6)-(Q)-2-nitrotoluenes of Formula VI in which Q is fluoro, chloro and bromo, the nitrocresols of formula VII and the nitrotoluic acids of Formula VIII are all described in the chemical literature.

Bromination of the (3,4,5 or 6)-(Q)-2-nitrotoluenes of Formula VI at the benzylic position is the first step in the sequence. It is preferably accomplished by using an N-bromoamide, for example, N-bromosuccinimide, a free-radical initiator, for example benzoyl peroxide and a solvent inert under the reaction conditions, for example, carbon tetrachloride at a temperature in the range of 50°–150°C. The resulting crude (3,4,5 or 6)-(Q)-2-nitrobenzyl bromides of the formula

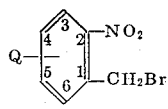

(Formula IX)

can be carried on the the next step without purification.

Condensation of the (3,4,5 or 6)-(Q)-2-nitrobenzyl bromides of Formula IX with thioglycolic acid ($HSCH_2COOH$) is the next step. It is preferably achieved using an inorganic base, for example, sodium bicarbonate as a hydrogen bromide acceptor and a solvent mixture comprising water and a lower-alkanol, for example, ethanol at a temperature in the range of 50°–150°C. and affords the (3,4,5 or 6)-(Q)-2-(2-nitrobenzylmercapto)acetic acids of the formula

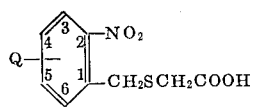

(Formula X)

A preferred method for the third step, the reduction of the nitro group of the (3,4,5 or 6)-(Q)-2-(2-nitrobenzylmercapto)acetic acids of Formula X, is the use of iron powder and hydrochloric acid in a solvent mixture comprising water and a lower-alkanol, for example, ethanol at a temperature in the range of 50°–150°C., producing the 2-(3,4,5 or 6)-(Q)-2-aminobenzylmercapto)acetic acids of the formula

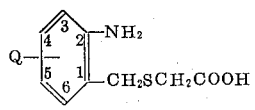

(Formula XI)

Cyclization of the 2-(3,4,5 or 6)-(Q)-2-aminobenzylmercapto)acetic acids of Formula XI to the (6,7,8 or 9)-(Q)-1,2,3,5-tetrahydro-4,1-benzothiazepin-2-ones of the formula

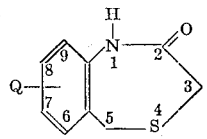

(Formula XII)

is preferably carried out thermally at a temperature in the range of 195°–225°C. without a solvent.

The preferred method for the preparation of the (6,7,8 or 9)-(Q)-1,2,3,5-tetrahydro-4,1-benzothiazepines of Formula V is reduction of the (6,7,8 or 9)-(Q)-1,2,3,55-tetrahydro-4,1-benzothiazepin-2-ones of Formula XII with a metal or a mixed metal hydride, for example, lithium aluminum hydride in an ethereal solvent, for example, tetrahydrofuran at a temperature in the range of 30°–130°C.

The following examples illustrate specific embodiments of my invention without limiting the latter thereto.

EXAMPLE 1

A. A mixture of N-bromosuccinimide (356 g., 2.00 mole), 2-nitrotoluene (VI: Q=H, 274 g., 2.00 mole), benzoyl peroxide (2.5 g., 0.010 mole) and carbon tetrachloride (1,200 ml.) was refluxed for 3 hr. More benzoyl peroxide (5 g., 0.02 mole) was added and refluxing was continued for 16 hr. The mixture was filtered and the filtrate was freed of solvent under reduced pressure to yield 2-nitrobenzyl bromide (IX: Q=H) as a red-brown oil (448.6 g.).

B. Sodium bicarbonate (346 g., 4.12 mole) was added in small portions with stirring and gentle heating to a solution of aqueous thioglycolic acid (70.4 percent, 263 g., 2.00 mole), ethanol (95 percent, 100 ml.) and water (450 ml.). With this solution maintained nearly at reflux a solution of crude 2-nitrobenzyl bromide (448.6 g.) in absolute ethanol (1,250 ml.) was added during 1¼ hr. The solution was refluxed for 1½ hr., cooled, concentrated under reduced pressure until most of the ethanol was removed, diluted with water (750 ml.) and extracted with benzene (4 × 250 ml.). Aqueous back washes (2 × 150 ml.) of the benzene extracts were added to the main aqueous extract and remaining benzene was removed from this combined aqueous extract under reduced pressure. Concentrated hydrochloric acid (650 ml.) was added with vigorous stirring. The resulting solid was collected by filtration, washed with water and dried, affording 2-(2-nitrobenzylmercapto)acetic acid (X: Q=H) (316.1 g., m.p. 90°–97°C.).

C. A solution of 2-(2-nitrobenzylmercapto)acetic acid (282.3 g., 1.25 mole), ethanol (95 percent, 1,000 ml.), water (500 ml.) and concentrated hydrochloric acid (15 ml.) was added during 1¼ hr. to a mixture of iron powder (220 g., 3.94 g.-atom), ethanol (95 percent, 100 ml.), water (100 ml.) and concentrated hydrochloric acid (11 ml.). The exothermicity of the reaction maintained the mixture at reflux during the addition. After the addition refluxing was continued for 5½ hr. The mixture was cooled, sodium hydroxide solution (35 percent, 200 ml.) was added with stirring and the resulting mixture was filtered. The filter cake was washed with ethanol, water and ethanol again. Concentration of the filtrate to about one l. in volume, adjustment of the pH of the concentrate with concentrated hydrochloric acid and dilute sodium hydroxide solution to 3.5, extraction of the resulting mixture with ethyl acetate (1 × 400 ml., then 3 × 175 ml.), and washing, drying and concentrating the ethyl acetate extracts produced a red-brown oil of crude 2-(2-aminobenzylmercapto)acid (XI: Q=H) (245.0 g.).

D. Crude 2-((2-aminobenzylmercapto)acetic acid (245.0 g.) was heated at 195°–225°C. during 25 min. The resulting solid was recrystallized first from ethyl acetate, then from N,N-dimethylformamide, affording pure 1,2,3,5-tetrahydro-4,1-benzo-thiazepin-2-one (XII: Q=H) (140.5 g., m.p. 214.5°–216.5°C.).

E. A solution of 1,2,3,5-tetrahydro-4,1-benzothiazepin-2-one (10.0 g., 0.0558 mole) in hot tetrahydrofuran (350 ml.) was added with stirring to a suspension of lithium aluminum hydride (3.8 g., 0.01 mole) in tetrahydrofuran (50 ml.). The addition funnel was rinsed with additional tetrahydrofuran (50 ml.). Tetrahydrofuran was distilled from the reaction mixture until its total volume was about 250 ml. A solution of water (7.6 ml.) in tetrahydrofuran (150 ml.) was then added cautiously with continued stirring. The mixture was filtered and the cake was washed with tetrahydrofuran. Concentration of the filtrate left a tan solid (10.4 g.), two recrystallizations of which from ether gave white crystals of 1,2,3,5-tetrahydro-4,1-benzothiazepine (V: Q=H), (4.0 g., m.p. 87°–88°C.).

F. A solution of propionyl chloride (6.0 g., 0.066 mole) and chloroform (15 ml.) was added cautiously to a solution of 1,2,3,5-tetrahydro-4,1-benzothiazepine (9.90 g., 0.0600 mole), triethylamine (15 ml.) and chloroform (50 ml.). The resulting hot solution was allowed to cool, washed with dilute hydrochloric acid (6N: 1 × 50 ml., 1.5N: 50 ml., back wash with 15 ml. chloroform), washed with dilute sodium bicarbonate solution (5 percent, 1 × 50 ml., 1 × 25 ml.), dried over magnesium sulfate, filtered and concentrated. Recrystallization of the resulting solid from ethyl acetate afforded white crystals of 1-propionyl-1,2,3,5-tetrahydro-4,1-benzothiazepine (I: Q=H, X=$CH_3CH_2$, n=O)(8.9 g., m.p. 127°–128.5 °C.).

The calculated elemental content of 1-propionyl-1,2,3,5-tetrahydro-4,1-benzothiazepine having the molecular formula $C_{12}H_{15}NOS$ is 6.33 percent of nitrogen and 14.47 percent of sulfur. Microanalysis gave values of 6.09 percent and 14.59 percent, respectively. An absorption band due to the amide carbonyl group was observed at 6.06μ in the infrared spectrum.

1-Propionyl-1,2,3,5-tetrahydro-4,1-benzothiazepine had a 30 minute intraperitoneal anticonvulsant $ED_{50}$ of 45 mg./kg. and a 30-minute oral anticonvulsant $ED_{50}$ of 88 mg./kg.

EXAMPLE 2

By substituting 3-fluoro-2-nitrotoluene (VI: Q=3-F) for 2-nitrotoluene in Step A of Example 1 and by carrying the resulting 3-fluoro-2-nitrobenzyl bromide (IX: Q=3-F) through the remaining Steps B-F, 9-fluoro-1-propionyl-1,2,3,5-tetrahydro-4,1-benzothiazepine (I: Q=9-F, X=$CH_3CH_2CO$, n=O) is obtained.

EXAMPLE 3

By substituting 4-chloro-2-nitrotoluene (VI: Q=4-Cl) for 2-nitrotoluene in Step A of Example 1 and by carrying the resulting 4-chloro-2-nitrobenzyl bromide (IX: Q=4-Cl) through the remaining Steps B-F, 8-chloro-1-propionyl-1,2,3,5-tetrahydro-4,1-benzothiazepine (I: Q=8-Cl, X=$CH_3CH_2CO$, n=O) is obtained.

EXAMPLE 4

By substituting 5-bromo-2-nitrotoluene (VI: Q=5-Br) for 2-nitrotoluene in Step A of Example 1 and by carrying the resulting 5-bromo-2-nitrobenzyl bromide (IX: Q=5-Br) through the remaining Steps B-F, 7-bromo-1-propionyl-1,2,3,5-tetrahydro-4,1-benzothiazepine (I: Q=7-Br, X=$CH_3CH_2CO$, n=O) is obtained.

EXAMPLE 5

By substituting 6-iodo-2-nitrotoluene (VI: Q=6-I) for 2-nitrotoluene in Step A of Example 1 and by carrying the resulting 6-iodo-2-nitrobenzyl bromide (IX: Q=6-I) through the remaining Steps B-F, 6-iodo-1-propionyl-1,2,3,5-tetrahydro-4,1-benzothiazepine (I: Q=6-I, X=$CH_3CH_2CO$, n=O) is obtained.

EXAMPLE 6

By substituting 5-methoxy-2-nitrotoluene (VI: Q=5-$CH_3O$) for 2-nitrotoluene in Step A of Example 1 and by carrying the resulting 5-methoxy-2-nitrobenzyl bromide (IX: Q=5-$CH_3O$) through the remaining Steps B-F, 7-methoxy-1-propionyl-1,2,3,5-tetrahydro-4,1-benzothiazepine (I: Q=7-$CH_3O$, X=$CH_3CH_2CO$, n=O) is obtained.

EXAMPLE 7

By substituting 5-isopropoxy-2-nitrotoluene (VI: Q=5-$(CH_3)_2CHO$) (prepared from the silver salt of 4nitro-m-cresol (VII) and isopropyl iodide) for 2-nitrotoluene in Step A of Example 1 and by carrying the resulting 5-isopropoxy-2-nitrobenzyl bromide (IX: Q=5-$CH_3O$) through the remaining Steps B-F, 7-isopropoxy-1-propionyl-1,2,3,5-tetrahydro-4,1-benzothiazepine (I: Q=7-$(CH_3)_2CHO$, X=$CH_3CH_2CO$, n=O) is obtained.

EXAMPLE 8

By substituting 6-trifluoromethyl-2-nitrotoluene (VI: Q=6-$CF_{3bh'}$ (prepared from 3-nitro-o-toluic acid (VIII) and sulfur tetrafluoride) for 2-nitrotoluene in Step A of Example 1 and by carrying the resulting 6-trifluoromethyl-2-nitrobenzyl bromide (IX: Q=6-$CF_3$) through the remaining Steps B-F, 6-trifluoromethyl-1-propionyl-1,2,3,5-tetrahydro-4,1-benzothiazepine (I: Q=6-$CF_3$, X=$CH_3CH_2CO$, n=O) is obtained.

EXAMPLE 9

By substituting two molar equivalents of formic acid and two molar equivalents of acetic anhydride for propionyl chloride in Step F of Example 1, 1-formyl-1,2,3,5-tetrahydro-4,1-benzothiazepine (I: Q=H, X=HCD, n=O) is obtained.

EXAMPLE 10

By substituting acetic anhydride for propionyl chloride in Step F of Example 1, 1-acetyl-1,2,3,5-tetrahydro-4,1-benzothiazepine (I: Q=H, X=$CH_3CO$, n=O) is obtained.

EXAMPLE 11

By substituting isobutyryl chloride for propionyl chloride in Step F of Example 1, 1-isobutyryl-1,2,3,5-tetrahydro-4,1-benzothiazepine (I: Q=H, X=$(CH_3)_2CHCO$, n=O) is obtained.

EXAMPLE 12

In a manner similar to Step F of Example 1, acylation of 1,2,3,5-tetrahydro-4,1-benzothiazepine (16.5 g., 0.100 mole) with cyclopropanecarbonyl chloride (10.45 g., 0.100 mole) gave a solid, recrystallization of which from ether afforded white crystals of 1-cyclopropanecarbonyl-1,2,3,5-tetrahydro-4,1-benzothiazepine (I: Q=H, X=$(CH_2)_2CHCO$, n=O) (18.33 g., m.p. 125°–127°C.).

1-Cyclopropanecarbonyl-1,2,3,5-tetrahydro-4,1-benzothiazepine had a 30 minute intraperitoneal anticonvulsant $ED_{50}$ of 10.6 mg./kg. and a ninety-minute intraperitoneal anti-convulsant $ED_{50}$ of 11 mg./kg.

EXAMPLE 13

By substituting cyclohexanecarbonyl chloride for propionyl chloride in Step F of Example 1, 1-cyclohexanecar-bonyl-1,2,3,5-tetrahydro-4,1-benzothiazepine (I: Q=H, X=(CH$_2$)$_5$CHCO, n=O) is obtained.

EXAMPLE 14

By substituting benzoyl chloride for propionyl chloride in Step F of Example 1, 1-benzoyl-1,2,3,5-tetrahydro-4,1-benzothiazepine (I: Q=H, X=C$_6$H$_5$CO, n=O) is obtained.

EXAMPLE 15

By substituting o-toluyl chloride for propionyl chloride in Step F of Example 1, 1-(o-toluyl)-1,2,3,5-tetrahydro-4,1-benzothiazepine (I: Q=H, X=o-CH$_3$C$_6$H$_4$CO, n=O) is obtained.

EXAMPLE 16

By substituting m-trifluoromethylbenzoyl chloride for propionyl chloride in Step F of Example 1, 1-(m-trifluoro-methyl)-1,2,3,5-tetrahydro-4,1-benzothiazepine (I: Q=H, X=m-CF$_3$C$_6$H$_4$CO, n=O) is obtained.

EXAMPLE 17

By substituting p-bromobenzoyl chloride for propionyl chloride in Step F of Example 1, 1-(p-bromobenzoyl)-1,2,3,5-tetrahydro-4,1-benzothiazepine (I: Q=H, X=p-BrC$_6$H$_4$CO, n=O) is obtained.

EXAMPLE 18

By substituting m-methoxybenzoyl chloride for propionyl chloride in Step F of Example 1, 1-(m-methoxybenzoyl)-1,2,3,5-tetrahydro-4,1-benzothiazepine (I: Q=H,X=m-CH$_3$OC$_6$H$_4$CO, n=O) is obtained.

EXAMPLE 19

By substituting p-acetamidobenzoyl chloride for propionyl chloride in Step F of Example 1, 1-(p-acetamido-benzoyl)-1,2,3,5-tetrahydro-4,1-benzothiazepine (I: Q=H, X=p-CH$_3$CONHC$_6$H$_4$CO, n=O) is obtained.

EXAMPLE 20

By substituting p-(dimethylamino)benzoyl chloride for propionyl chloride in Step F of Example 1, 1-[p-(dimethyl-amino)benzoyl]-1,2,3,5-tetrahydro-4,1-benzothiazepine (I: Q=H, X=p-(CH$_3$)$_2$NC$_6$H$_4$CO, n=O) is obtained.

EXAMPLE 21

By substituting p-nitrobenzoyl chloride for propionyl chloride in Step F of Example 1, 1-(p-nitrobenzoyl)-1,2,3,5-tetrahydro-4,1-benzothiazepine (I: Q=H, X=p-O$_2$NC$_6$H$_4$CO, n=O) is obtained.

EXAMPLE 22

By substituting p-(methanesulfonyl)benzoyl chloride for propionyl chloride in Step F of Example 1, 1-[p-(methane-sulfonyl)benzoyl]-1,2,3,5-tetrahydro-4,1-benzothiazepine (I: Q=H, X=p-CH$_3$SO$_2$C$_6$H$_4$CO, n=O) is obtained.

EXAMPLE 23

By substituting 3-chloro-4-methoxybenzoyl chloride for propionyl chloride in Step F of Example 1, 1-(3-chloro-4-methoxybenzoyl)-1,2,3,5-tetrahydro-4,1-benzothiazepine (I: Q=H, X=3-Cl-4-CH$_3$OC$_6$H$_3$CO, n=O) is obtained.

EXAMPLE 24

By substituting 2,5-dichloro-3-nitrobenzoyl chloride for propionyl chloride in Step F of Example 1, 1-(2,5-dichloro-3-nitrobenzoyl)-1,2,3,5-tetrahydro-4,1-benzothiazepine (I: Q=H, X=2,5-Cl$_2$-3-O$_2$NC$_6$H$_2$CO, n=O) is obtained.

EXAMPLE 25

In a manner similar to Step F of Example 1, acylation of 1,2,3,5-tetrahydro-4,1-benzothiazepine (11.55 g., 0.0700 mole) with β-phenylpropionyl chloride (hydrocinnamoyl chloride, 11.8 g., 0.0700 mole) gave an oil which crystallized and which was recrystallized from ether to afford white crystals of 1-(β-phenylpropionyl)-1,2,3,5-tetrahydro-4,1-benzothiazepine (I: Q=H, X=C$_6$H$_5$CH$_2$CH$_2$CO, n=O) (10.9 g., m.p. 86°–87 °C.).

EXAMPLE 26

By substituting diphenylacetyl chloride for propionyl chloride in Step F of Example 1, 1-diphenylacetyl-1,2,3,5-tetrahydro-4,1-benzothiazepine(I: Q=H,X=X=C$_6$H$_5$CHCH$_2$CO, n=O) is obtained.

EXAMPLE 27

In a manner similar to Step F of Example 1, acylation of 1,2,3,5-tetrahydro-4,1-benzothiazepine (8.25 g., 0.0500 mole) with trifluoroacetic anhydride (12.0 g., 0.0572 mole) gave a solid, two recrystallizations of which, first from ether and then from ether-pentane, afforded white crystals of 1-trifluoroacetyl-1,2,3,5-tetrahydro-4,1-benzothiazepine (I: Q=H, X=CF$_3$CO, n=O) (3.0 g., m.p. 92.5°–93.5°C.).

1-Trifluoroacetyl-1,2,3,5-tetrahydro-4,1-benzothiazepine had 30-minute and 90-minute intraperitoneal anti-convulsant doses of 8.6 and 16.4 mg./kg., respectively, and 30-minute and 90-minute oral anticonvulsant doses of 19 and 10.2 mg./kg., respectively.

EXAMPLE 28

In a manner similar to Step F of Example 1, acylation of 1,2,3,5-tetrahydro-4,1-benzothiazepine (16.5 g., 0.100 mole) with pentafluoropropionyl chloride (25.5 g., 0.140 mole) gave an oil which crystallized and which was recrystallized from ether-pentane, affording white crystals of 1-pentafluoropropionyl-1,2,3,5-tetrahydro-4,1-benzothiazepine (I: Q=H, X=CF$_3$-CF$_2$CO, n=O) (19.4 g., m.p. 96°–98°C.).

EXAMPLE 29

In a manner similar to Step F of Example 1, acylation of 1,2,3,5-tetrahydro-4,1-benzothiazepine (16.5 g., 0.100 mole) with heptafluorobutyryl chloride (32.55 g., 0.14 mole) gave an oil which crystallized and which was recrystallized twice from pentane, affording white crystals of 1-heptafluorobutyryl-1,2,3,5-tetrahydro-4,1-benzothiazepine (I: Q=H, X=CF$_3$CF$_2$CF$_2$CO, n=0) (21.55 g., m.p. 49°–50°C.).

EXAMPLE 30

By substituting iodoacetyl chloride for propionyl chloride in Step F of Example 1, 1-iodoacetyl-1,2,3,5-tetrahydro-4,1-benzothiazepine (I: Q=H, X=ICH$_2$CO, n=0) is obtained.

EXAMPLE 31

In a manner similar to Step F of Example 1, acylation of 1,2,3,5-tetrahydro-4,1-benzothiazepine (11.55 g., 0.0700 mole) with dichloroacetyl chloride (10.33 g., 0.0700 mole) gave a solid, recrystallization of which from ethyl acetate afforded white crystals of 1-dichloroacetyl-1,2,3,5-tetrahydro-4,2-benzothiazepine (I: Q=H, X=Cl$_2$CHCO, n=0) (11.4 g., m.p. 174°–175 °C.).

EXAMPLE 32

In a manner similar to Step F of Example 1 acylation of 1,2,3,5-tetrahydro-4,1-benzothiazepine (12.38 g., 0.0750 mole) with dibromoacetyl chloride (17.75 g., 0.0750 mole) gave a solid, recrystallization of which from ethyl acetate afforded cream-colored crystals of 1-dibromoacetyl-1,2,3,5-tetrahydro-4,1-benzothiazepine (I: Q=H, X=Br$_2$CHCO, n=0) (17.6 g., m.p. 166°–168°C.).

EXAMPLE 33

In a manner similar to Step F of Example 1, acylation of 1,2,3,5-tetrahydro-4,1-benzothiazepine (11.55 g., 0.0700 mole) with pentachloro-2,4-pentadienoyl chloride (20.23 g., 0.700 mole) gave a semi-solid, which was washed with pentane and recrystallized from ether, affording white crystals of 1-(pentachloro-2,4-pentadienoyl)-1,2,3,5-tetrahydro-4,1-benzo-thiazepine (I: Q=H, X=Cl$_2$C=CCl-CCl=CClCO, n=0) (15.7 g., m.p. 111°–112°C.).

EXAMPLE 34

In a manner similar to Step F of Example 1, except that the reaction temperature was maintained at −10° –0°C., acylation of 1,2,3,5-tetrahydro-4,1-benzothiazepine (14.25 g., 0.0864 mole) with diphenylchloroacetyl chloride (22.90 g., 0.0864 mole) gave a gum (26.4 g.), part (10.0 g.) of which was crystallized from ether, affording white crystals of 1-diphenylchloroacetyl-1,2,3,5-tetrahydro-4,1-benzothiazepine (I: Q=H, X=(C$_6$H$_5$)$_2$CClCO, n=0) (3.6 g., m.p. 155°–156°C.).

EXAMPLE 35

Oxidation of 1-propionyl-1,2,3,5-tetrahydro-4,1-benzothiazepine with one molar equivalent quantity of hydrogen peroxide (30 percent) and acetic acid as the solvent at 30°–50°C. affords 1-propionyl-1,2,3,5-tetrahydro-4,1-benzothiazepine-4-oxide (I: Q=H, X=CH$_3$CH$_2$CO, n=1.

EXAMPLE 36

Oxidation of 7-methoxy-1-propionyl-1,2,3,5-tetrahydro-4,1-benzothiazepine in the manner of Example 35 affords 7-methoxy-1-propionyl-1,2,3,5-tetrahydro-4,1-benzothiazepine-4-oxide (I: Q=7-CH$_3$O, X=CH$_3$CH$_2$CO, n=1).

EXAMPLE 37

Oxidation of 1-cyclohexanecarbonyl-1,2,3,5-tetrahydro-4,1-benzothiazepine in the manner of Example 35 affords 1-cyclohexanecarbonyl-1,2,3,5-tetrahydro-4,1-benzothiazepine-4-oxide (I: Q=H, X=(CH$_2$)$_5$CHCO, n=1).

EXAMPLE 38

Oxidation of 1-benzoyl-1,2,3,5-tetrahydro-4,1-benzothiazepine in the manner of Example 35 affords 1-benzoyl-1,2,3,5-tetrahydro-4,1-benzothiazepine-4-oxide (I: Q=H, X=C$_6$H$_5$CO, n=1).

EXAMPLE 39

Oxidation of 1-(p-bromobenzoyl)-1,2,3,5-tetrahydro-4,1-benzothiazepine in the manner of Example 35 affords 1-(p-bromobenzoyl)-1,2,3,5-tetrahydro-4,1-benzothiazepine-4-oxide (I: Q=H, X=p-BrC$_6$H$_4$CO, n=1).

EXAMPLE 40

Oxidation of 1-(β-phenylpropionyl)-1,2,3,5-tetrahydro-4,1-benzothiazepine in the manner of Example 35 affords 1-(β-phenylpropionyl)-1,2,3,5-tetrahydro-4,1-benzothiazepine-4-oxide (I: Q=H, X=C$_6$H$_{5}$CH$_2$CH$_2$CO, n=1).

EXAMPLE 41

Oxidation of 1-diphenylacetyl-1,2,3,5-tetrahydro-4,1-benzothiazepine in the manner of Example 35 affords 1-diphenylacetyl-1,2,3,5-tetrahydro-4,1-benzothiazepine-4- oxide (I: Q=H, X=(C$_6$H$_5$)$_2$CHCO, n=2).

EXAMPLE 42

Oxidation of 1-trifluoroacetyl-1,2,3,5-tetrahydro-4,1-benzothiazepine in the manner of Example 35 affords 1-trifluoroacetyl-1,2,3,5-tetrahydro-4,1-benzothiazepine-4- oxide (I: Q=H, X=CF$_3$CO, n=1).

EXAMPLE 43

A solution of 1-dichloroacetyl-1,2,3,5-tetrahydro-4,1-benzothiazepine (5.0 g., 0.018 mole), hydrogen peroxide (30%, 25 ml., 0.24 mole), acetone (200 ml.) and aqueous acetic acid (10%, 30 ml.) was allowed to stand overnight at room temperature, then heated at 55-60°C. for 8 hr. The reaction solution was made alkaline and concentrated to about 200 ml. The resulting solid was collected and recrystallized from ethyl acetate (2.5 g., m.p. 172-173°C.). This material was combined with material from another run and recrystallized again from ethyl acetate, affording white crystals of 1-dichloroacetyl-1,2,3,5-tetrahydro-4,1-benzothiazepine-4-oxide (I: Q=H, X=Cl$_2$CHCO, n=1) (m.p. 177-178°C.).

The calculated elemental content of 1-dichloroacethyl-1,2,3,5-tetrahydro-4,1-benzothiazepine-4-oxide having the molecular formula $C_{11}H_{11}Cl_2NO_2S$ is 4.79% of nitrogen and 10.97% of sulfur. Microanalysis gave values of 4.75% and 10.96%, respectively.

EXAMPLE 44

Aqueous hydrogen peroxide (30%, 20 ml., 0.2 mole) was added slowly to a solution of 1-propionyl-1,2,3,5-tetrahydro-4,1-benzothiazepine (11.05 g., 0.0500 mole) and glacial acetic acid (75 ml.). The solution was heated on the steam bath for 1 hr., cooled, diluted with water (300 ml.) and treated with sodium carbonate (65 g.). The mixture was extracted with chloroform (3 × 100 ml.). Sodium carbonate solution (15 percent, 100 ml.) was added to the aqueous layer and it was extracted further with chloroform (2 × 75 ml.). The combined chloroform extracts were washed with sodium bicarbonate solution (5 percent, 100 ml., backwash with 25 ml. of chloroform), dried over magnesium sulfate, filtered and concentrated. Recrystallization of the resulting solid, first from chloroform, then from acetone, afforded white crystals of 1-propionyl-1,2,3,5-tetrahydro-4,1-benzothiazepine-4,4-dioxide (I: Q=H, X=$CH_3CH_2CO$, $n$=2) (8.95 g., m.p. 196.5°–198°C.).

The calculated elemental content of 1-propionyl-1,2,3,5-tetrahydro-4,1-benzothiazepine-4,4-dioxide having the molecular formula $C_{12}H_{15}NO_3S$ is 56.91 percent of carbon, 5.97 percent of hydrogen and 12.64 percent of sulfur. Microanalysis gave values of 57.04, 5.86 and 12.65 percent, respectively.

1-Propionyl-1,2,3,5-tetrahydro-4,1-benzothiazepine-4,4-dioxide had a 30-minute intraperitoneal anticonvulsant $ED_{50}$ of 34.5 mg./kg. and a 30-minute oral anticonvulsant $ED_{50}$ of 40 mg./kg.

EXAMPLE 45

Oxidation of 7-methoxy-1-propionyl-1,2,3,5-tetrahydro-4,1-benzothiazepine in the manner of Example 44 affords 7-methoxy-1-propionyl-1,2,3,5-tetrahydro-4,1-benzothiazepine-4,4-dioxide (I: Q=H, X=$CH_3CH_2CO$, $n$=2).

EXAMPLE 46

In a manner similar to Example 44, except that no external heating was applied to the reaction, oxidation of 1-cyclopropanecarbonyl-1,2,3,5-tetrahydro-4,1-benzothiazepine (10.53 g., 0.0452 mole) gave an oil which crystallized and which was recrystallized from ethyl acetate, affording white crystals of 1-cyclopropanecarbonyl-1,2,3,5-tetrahydro-4,1-benzothiazepine-4,4-dioxide (I: Q=H, X=$(CH_2)_2$CHCO, $n$=2) (10.1 g., m.p. 151°–153°C.).

EXAMPLE 47

Oxidation of 1-benzoyl-1,2,3,5-tetrahydro-4,1-benzothiazepine in the manner of Example 44 affords 1-benzoyl-1,2,3,5-tetrahydro-4,1-benzothiazepine-4,4-dioxide (I: Q=H, X=$C_6H_5CO$, $n$=2).

EXAMPLE 48

Oxidation of 1-(p-bromobenzoyl)1,2,3,5-tetrahydro-4,1-benzothiazepine in the manner of Example 44 affords 1-(p-bromobenzoyl)-1,2,3,5-tetrahydro-4,1-benzothiazepine-4,4-dioxide (I: Q=H, X=p-$BrC_6H_4CO$, $n$=2).

EXAMPLE 49

Oxidation of 1-(β-phenylpropionyl)-1,2,3,5-tetrahydro-4,1-benzothiazepine in the manner of Example 44 affords 1-(β-phenylpropionyl)-1,2,3,5-tetrahydro-4,1-benzothiazepine-4,4-dioxide (I: Q=H, X=$C_6H_5CH_2CH_2CO$, $n$=2)

EXAMPLE 50

Oxidation of 1-diphenylacetyl-1,2,3,5-tetrahydro-4,1 benzothiazepine in the manner of Example 44 affords 1-diphenyl-acetyl-1,2,3,5-tetrahydro-4,1-benzothiazepine-4,4-dioxide (I: Q=H, X=$(C_6H_5)_2CHCO$, $n$=2).

EXAMPLE 51

In a manner similar to Example 44, oxidation of 1-pentafluoropropionyl-1,2,3,5-tetrahydro-4,1-benzothiazepine (10.0 g., 0.0322 mole) gave a solid which was recrystallized from ether, affording white crystals of 1-pentafluoropropionyl-1,2,3,5-tetrahydro-4,1-benzothiazepine-4,4-dioxide (I: Q=H, X=$CF_3CF_2CO$, $n$=2) (10.2 g., m.p. 157°–159°C.).

EXAMPLE 52

In a manner similar to Example 44, except that no external heating was applied to the reaction, oxidation of 1-heptafluorobutyryl-1,2,3,5-tetrahydro-4,1-benzothiazepine (10.83 g., 0.0300 mole) gave a solid, recrystallization of which from ethyl acetate afforded white crystals of 1-heptafluorobutyryl-1,2,3,5-tetrahydro-4,1-benzothiazepine-4,4-dioxide (I: Q=H, X=$CF_3CF_2CF_2CO$, $n$=2) (8.32 g., m.p. 188°–189°C.).

EXAMPLE 53

In a manner similar to Example 44, except that the product was isolated as it crystallized from the reaction solution, oxidation of 1-dichloroacetyl-1,2,3,5-tetrahydro-4,1-benzothiazepine (13.80 g., 0.0500 mole) gave a solid, recrystallization of which, first from ethyl acetate, then from acetonitrile, afforded white crystals of 1-dichloroacetyl-1,2,3,5-tetrahydro-4,1-benzothiazepine-4,4-dioxide (I: Q=H, X=$CL_2CHCO$, $n$=2) (10.5 g., m.p. 229°–232°C.).

EXAMPLE 54

In a manner similar to Example 44, except that the product was isolated without further purification as it crystallized from the reaction solution, oxidation of 1-dibromoacetyl-1,2,3,5-tetrahydro-4,1-benzothiazepine (9.1 g., 0.025 mole) gave white crystals of 1-dibromoacetyl-1,2,3,5-tetrahydro-4,1-benzothiazepine-4,4-dioxide (I: Q=H, X=$Br_2CHCO$, $n$=2) (9.0 g., m.p. 243°–245°C. with decomposition).

EXAMPLE 55

Acylation of 1,2,3,5-tetrahydro-4,1-benzothiazepine with malonyl chloride in the manner of Step F of Example 1 affords 1,1'-malonylbis(1,2,3,5-tetrahydro-4,1-benzothiazepine) (II: Q=H, X'=$COCH_2CO$, $n$=0).

EXAMPLE 56

Acylation of 9-fluoro-1,2,3,5-tetrahydro-4,1-benzothiazepine (from Step E of Example 2) with malonyl chloride in the manner of Step F of Example 1 affords 1,1'-malonylbis-(9-fluoro-1,2,3,5-tetrahydro-4,1-benzothiazepine) (II: Q=9-F, X'=COCH$_2$CO, n=0).

EXAMPLE 57

Acylation of 8-chloro-1,2,3,5-tetrahydro-4,1-benzothiazepine (from Step E of Example 3) with malonyl chloride in the manner of Step F of Example 1 affords 1,1'-malonylbis-(8-chloro-1,2,3,5-tetrahydro-4,1-benzothiazepine) (II: Q=8-Cl, X'=COCH$_2$CO, n=0).

EXAMPLE 58

Acylation of 7-bromo-1,2,3,5-tetrahydro-4,1-benzothiazepine (from Step E of Example 4) with malonyl chloride in the manner of Step F of Example 1 affords 1,1'-malonylbis-(7-bromo-1,2,3,5-tetrahydro-4,1-benzothiazepine) (II: Q=7-Br, X'=COCH$_2$CO, n=0).

EXAMPLE 59

Acylation of 6-iodo-1,2,3,5-tetrahydro-4,1-benzothiazepine (from Step E of Example 5) with malonyl chloride in the manner of Step F of Example 1 affords 1,1'-malonylbis-(6-iodo-1,2,3,5-tetrahydro-4,1-benzothiazepine) (II: Q=6-I, X'=COCH$_2$CO, n=0).

EXAMPLE 60

Acylation of 7-methoxy-1,2,3,5-tetrahydro-4,1-benzothiazepine (from Step E of Example 6) with malonyl chloride in the manner of Step F of Example 1 affords 1,1'-malonylbis-(7-methoxy-1,2,3,5-tetrahydro-4,1-benzothiazepine) (II: Q=7-CH$_3$O, X'=COCH$_{2cl}$CO, n=0).

EXAMPLE 61

Acylation of 7-isopropoxy-1,2,3,5-tetrahydro-4,1-benzothiazepine (from Step E of Example 7) with malonyl chloride in the manner of Step F of Example 1 affords 1,1'-malonylbis(7-isopropoxy-1,2,3,5-tetrahydro-4,1-benzothiazepine) (II: Q=7-(CH$_3$)$_2$CHO, X'=COCH$_2$CO, n=0).

EXAMPLE 62

Acylation of 6-trifluoromethyl-1,2,3,5-tetrahydro-4,1-benzothiazepine (from Step E of Example 8) with malonyl chloride in the manner of Step F of Example 1 affords 1,1'-malonylbis(6-trifluoromethyl-1,2,3,5-tetrahydro-4,1-benzothiazepine) (II: Q=6-CF$_3$, X'=COCH$_{2cl}$CO, n=0).

EXAMPLE 63

Acylation of 1,2,3,5-tetrahydro-4,1-benzothiazepine with adipyl chloride in the manner of Step F of Example 1 affords 1,1'-adipylbis(1,2,3,5-tetrahydro-4,1-benzothiazepine) (II: Q=H, X'=COCH$_2$CH$_2$CH$_2$CH$_2$CO, n=0).

EXAMPLE 64

Acylation of 1,2,3,5-tetrahydro-4,1-benzothiazepine with α,β-dimethylsuccinyl chloride in the manner of Step F of Example 1 affords 1,1'-(α,β-dimethylsuccinyl)bis(1,2,3,5-tetrahydro-4,1-benzothiazepine) (II: Q=H, X'=COCH(CH$_3$)CH(CH$_3$)CO, n=0).

EXAMPLE 65

Acylation of 1,2,3,5-tetrahydro-4,1-benzothiazepine with tetrafluorosuccinyl chloride in the manner of Step F of Example 1 affords 1,1'-tetrafluorosuccinylbis(1,2,3,5-tetrahydro-4,1-benzothiazepine) (II: Q=H, X' = COCF$_2$CF$_2$CO, n = 0).

EXAMPLE 66

In a manner similar to Step F of Example 1 acylation of 1,2,3,5-tetrahydro-4,1-benzothiazepine (6.60 g., 0.0400 mole) with hexafluoroglutaryl chloride (5.6 g., 0.20 mole) gave a semi-solid, which was washed with ether, then recrystallized from ether, affording white crystals of 1,1'-hexafluoroglu-tarylbis(1,2,3,5-tetrahydro-4,1-benzothiazepine) (II: Q=H, X'=COCF$_2$CF$_2$CF$_2$CO, n=0) (1.7 g., m.p. 152°–153.5°C.).

EXAMPLE 67

Oxidation of 1,1'-malonylbis(1,2,3,5-tetrahydro-4,1-benzothiazepine) in the manner of Example 43 affords 1,1'-malonylbis(1,2,3,5-tetrahydro-4,1-benzothiazepine-4-oxide) (II: Q=H, X'=COCH$_2$CO, n=1).

EXAMPLE 68

Oxidation of 1,1'-malonylbis(7-methoxy-1,2,3,5-tetrahydro-4,1-benzothiazepine) in the manner of Example 43 affords 1,1'-malonylbis(7-methoxy-1,2,3,5-tetrahydro-4,1-benzothiazepine-4-oxide) (II: Q=7-CH$_3$O, X'=COCH$_2$CO, n=1).

EXAMPLE 69

Oxidation of 1,1'-tetrafluorosuccinylbis(1,2,3,5-tetrahydro-4,1-benzothiazepine) in the manner of Example 43 affords 1,1'-tetrafluorosuccinylbis(1,2,3,5-tetrahydro-4,1-benzothiazepine-4-oxide) (II: Q=H, X' = COCF$_2$CF$_2$CO, n = 1).

EXAMPLE 70

Oxidation of 1,1'-malonylbis(1,2,3,5-tetrahydro-4,1-benzothiazepine) in the manner of Example 44 affords 1,1'-malonylbis(1,2,3,5-tetrahydro-4,1-benzothiazepine-4,4-dioxide) (II: Q=H, X'=COCH$_2$CO, n=2).

EXAMPLE 71

Oxidation of 1,1'-malonylbis(7-methoxy-1,2,3,5-tetrahydro-4,1-benzothiazepine) in the manner of Example 44 affords 1,1'-malonylbis(7-methoxy-1,2,3,5-tetrahydro-4,1-benzothiazepine-4,4-dioxide) (II: Q=7-CH$_3$O, X'=COCH$_2$CO, n=2).

EXAMPLE 72

Oxidation of 1,1'-tetrafluorosuccinylbis(1,2,3,5-tetrahydro-4,1-benzothiazepine) in the manner of Example 44 affords 1,1'-tetrafluorosuccinylbis(1,2,3,5,-tetrahydro-4,1-benzothiazepine-4,4-dioxide) (II: Q=H, X' = COCF$_2$CF$_2$CO, $n = 2$).

EXAMPLE 73

A solution of 1,2,3,5-tetrahydro-4,1-benzothiazepine (20.63 g., 0.125 mole), potassium cyanate (11.25 g., 0.139 mole) and glacial acetic acid (315 ml.) was heated for 1½ hr. on the steam bath. The solvent was removed under reduced pressure. A chloroform solution of the residue was washed with sodium carbonate solution (100 ml. of 7½ percent solution, 200 ml. of 15 percent solution and 100 ml. of 3¾ percent solution), dilute hydrochloric acid (3N, 100 ml.) and water (backwash 2 × 15 ml. of chloroform), dried over magnesium sulfate, filtered and concentrated. One recrystallization of the resulting solid from ethyl acetate afforded a product, part (5.85 g.) of which was combined with material from other runs (4.15 g.) and recrystallized again from ethyl acetate to give white crystals of 1-carbamyl-1,2,3,5-tetrahydro-4,1-benzothiazepine (III: Q=H, Y=NH$_2$CO, $n$=0) (8.75 g., m.p. 157°–158°C.).

EXAMPLE 74

Carbamylation of 9-fluoro-1,2,3,5-tetrahydro-4,1 benzothiazepine (from Step E of Example 2) in the manner of Example 73 affords 9-fluoro-1-carbamyl-1,2,3,5-tetrahydro-4,1-benzothiazepine (III: Q=9-F, Y=NH$_2$CO, $n$=0).

EXAMPLE 75

Carbamylation of 8-chloro-1,2,3,5-tetrahydro-4,1-benzothiazepine (from Step E of Example 3) in the manner of Example 73 affords 8-chloro-1-carbamyl-1,2,3,5-tetrahydro-4,1-benzothiazepine (III: Q=8-Cl, Y=NH$_2$CO, $n$=0).

EXAMPLE 76

Carbamylation of 7-bromo-1,2,3,5-tetrahydro-4,1-benzothiazepine (from Step E of Example 4) in the manner of Example 73 affords 7-bromo-1-carbamyl-1,2,3,5-tetrahydro-4,1-benzothiazepine (III: Q=7-Br, Y=NH$_2$CO, $n$=0).

EXAMPLE 77

Carbamylation of 6-iodo-1,2,3,5-tetrahydro-4,1 benzothiazepine (from Step E of Example 5) in the manner of Example 73 affords 6-iodo-1-carbamyl-1,2,3,5-tetrahydro-4,1-benzothiazepine (III: Q=6-I, Y=NH$_2$CO, $n$=0).

EXAMPLE 78

Carbamylation of 7-methoxy-1,2,3,5-tetrahydro-4,1-benzothiazepine (from Step E of Example 6) in the manner of Example 73 affords 7-methoxy-1-carbamyl-1,2,3,5-tetrahydro-4,1-benzothiazepine (III: Q=7-CH$_3$O, Y=NH$_2$CO, $n$=0).

EXAMPLE 79

Carbamylation of 7-isopropoxy-1,2,3,5-tetrahydro-4,1-benzothiazepine (from Step E of Example 7) in the manner of Example 73 affords 7-isopropoxy-1-carbamyl-1,2,3,5-tetrahydro-4,1-benzothiazepine (III: Q=7-(CH$_3$)$_2$CHO, Y=NH$_2$CO, $n$=0).

EXAMPLE 80

Carbamylation of 6-trifluoromethyl-1,2,3,5-tetrahydro-4,1-benzothiazepine (from Step E of Example 8) in the manner of Example 73 affords 6-trifluoromethyl-1-carbamyl-1,2,3,5-tetrahydro-4,1-benzothiazepine (III: Q=6-CF$_3$, Y=NH$_2$CO, $n$=0).

EXAMPLE 81

By substituting sodium thiocyanate for potassium cyanate in Example 73 1-thiocarbamyl-1,2,3,5-tetrahydro-4,1-benzothiazepine (III: Q=H, Y=NH$_2$CS, $n$=0) is obtained.

EXAMPLE 82

Heating 1,2,3,5-tetrahydro-4,1-benzothiazepine and methylisocyanate in chloroform as the solvent at 60°C. gives 1-(N-methylcarbamyl)-1,2,3,5-tetrahydro-4,1-benzothiazepine (III: Q=H, Y=CH$_3$NHCO, $n$=0).

EXAMPLE 83

Heating 1,2,3,5-tetrahydro-4,1-benzothiazepine and N-tert-butylisocyanate in the manner of Example 82 gives 1-[N-(tert-butyl)carbamyl]-1,2,3,5-tetrahydro-4,1-benzothiazepine (III: Q=H, Y=(CH$_3$)$_3$CNHCO, $n$=0).

EXAMPLE 84

Heating 1,2,3,5-tetrahydro-4,1-benzothiazepine and ethylisothiocyanate in the manner of Example 82 gives 1-(N-ethylthiocarbamyl)-1,2,3,5-tetrahydro-4,1-benzothiazepine (III: Q=H, Y=CH$_3$CH$_2$NHCS, $n$=0).

EXAMPLE 85

Heating 1,2,3,5-tetrahydro-4,1-benzothiazepine and butylisothiocyanate in the manner of Example 82 gives 1-(N-butylthiocarbamyl)-1,2,3,5-tetrahydro-4,1-benzothiazepine (III: Q=H, Y=CH$_3$CH$_2$CH$_2$CH$_2$NHCS, $n$=0).

EXAMPLE 86

Heating 1,2,3,5-tetrahydro-4,1-benzothiazepine and phenylisocyanate in the manner of Example 82 gives 1-(N-phenyl-carbamyl)-1,2,3,5-tetrahydro-4,1-benzothiazepine (III: Q=H, Y=C$_6$H$_5$NHCO, $n$=0).

EXAMPLE 87

Heating 1,2,3,5-tetrahydro-4,1-benzothiazepine and phenylisothiocyanate in the manner of Example 82 gives 1-(N-phenylthiocarbamyl)-1,2,3,5-tetrahydro-4,1-benzothiazepine (III: Q=H, Y=C$_6$H$_5$NHCS, $n$=0).

EXAMPLE 88

Heating 1,2,3,5-tetrahydro-4,1-benzothiazepine and o-tolylisocyanate in the manner of Example 82 gives 1-[N-(o-tolyl)carbamyl]-1,2,3,5-tetrahydro-4,1-benzothiazepine (III: Q=H, Y=o-CH$_3$C$_6$H$_4$NHCO, $n$=0).

EXAMPLE 89

Heating 1,2,3,5-tetrahydro-4,1-benzothiazepine and m-trifluoromethylphenylisocyanate in the manner of Example 82 gives 1-[N-(m-trifluoromethylphenyl)carbamyl]-1,2,3,5-tetra-hydro-4,1-benzothiazepine (III: Q=H, Y=m-CF$_3$C$_6$H$_4$NHCO, $n$=0).

EXAMPLE 90

Heating 1,2,3,5-tetrahydro-4,1-benzothiazepine and p-bromophenylisocyanate in the manner of Example 82 gives 1[N-(p-bromophenyl)carbamyl]-1,2,3,5-tetrahydro-4,1-benzothiazepine (III: Q=H, Y=p-BrC$_6$H$_4$NHCO, n=0).

EXAMPLE 91

Heating 1,2,3,5-tetrahydro-4,1-benzothiazepine and m-methoxyphenylisocyanate in the manner of Example 82 give 1-[N-(m-methoxyphenyl)carbamyl]-1,2,3,5-tetrahydro-4,1-benzothiazepine (III: Q=H, Y=m-CH$_3$OC$_6$H$_4$NHCO, n=0).

EXAMPLE 92

Heating 1,2,3,5-tetrahydro-4,1-benzothiazepine and p-acetamidophenylisocyanate in the manner of Example 82 gives 1-[N-(p-acetamideophenyl)carbamyl]-1,2,3,5-tetrahydro-4,1-benzothiazepine (III: Q=H, Y=p-CH$_3$CONHC$_6$NHCO, n=0).

EXAMPLE 93

Heating 1,2,3,5-tetrahydro-4,1-benzothiazepine and m-nitrophenyliscocyanate in the manner of Example 82 gives 1-[N-(m-nitrophenyl)carbamyl]-1,2,3,5-tetrahydro-4,1-benzothiazepine (III: Q=H, Y=m-O$_2$NC$_6$H$_4$NHCO, n=0).

EXAMPLE 94

Heating 1,2,3,5-tetrahydro-4,1-benzothiazepine and p-methylmercaptophenylisocyanate in the manner of Example 82 gives 1-[N-(p-methylmercaptophenyl)carbamyl]-1,2,3,5-tetrahydro-4,1-benzothiazepine (III: Q=H, Y=p-CH$_3$SC$_6$H$_4$NHCO, n=0).

EXAMPLE 95

Heating 1,2,3,5-tetrahydro-4,1-benzothiazepine and 4-chloro-o-tolylisocyanate in the manner of Example 82 gives 1-[N-(4-chloro-o-tolyl)carbamyl]-1,2,3,5-tetrahydro-4,1-benzothiazepine (III: Q=H, Y=4-Cl-o-CH$_3$C$_6$H$_3$NHCO, n=0).

EXAMPLE 96

Heating 1,2,3,5-tetrahydro-4,1-benzothiazepine and 2,5-dichloro-4-nitrophenyliscocyanate in the manner of Example 82 gives 1-[N-(2,5-dichloro-4-nitrophenyl)carbamyl]-1,2,3,5-tetrahydro-4,1-benzothiazepine (III: Q=H, Y=2,5-Cl$_2$-4-O$_2$NC$_6$H$_2$-NHCO, n=0).

EXAMPLE 97

Heating 1,2,3,5-tetrahydro-4,1-benzothiazepine and p-bromophenylisothiocyanate in the manner of Example 82 gives 1-[N-(p-bromophenyl)thiocarbamyl]-1,2,3,5-tetrahydro-4,1-benzothiazepine (III: Q=H, Y=BrC$_6$HNHCS, n=0).

EXAMPLE 98

Oxidation of 1-carbamyl-1,2,3,5-tetrahydro-4,1-benzothiazepine in the manner of Example 35 affords 1-carbamyl-1,2,3,5-tetrahydro-4,1-benzothiazepine-4-oxide (III: Q=H, Y=NH$_2$CO, n=1).

EXAMPLE 99

Oxidation of 7-methoxy-1-carbamyl-1,2,3,5-tetrahydro-4,1-benzothiazepine in the manner of Example 35 affords 7-methoxy-1-carbamyl-1,2,3,5-tetrahydro-4,1-benzothiazepine-4-oxide (III: Q=7-CH$_3$O, Y=NH$_2$CO, n=1).

EXAMPLE 100

Oxidation of 1-thiocarbamyl-1,2,3,5-tetrahydro-4,1-benzothiazepine in the manner of Example 35 affords 1-thio-carbamyl-1,2,3,5-tetrahydro-4,1-benzothiazepine-4-oxide (III: Q=H, Y=NH$_2$CS, n=1).

EXAMPLE 101

Oxidation of 1(N-methylcarbamyl)-1,2,3,5-tetrahydro-4,1-benzothiazepine in the manner of Example 35 affords 1-(N-methylcarbamyl)-1,2,3,5-tetrahydro-4,1-benzothiazepine-4-oxide (III: Q=H, Y=CH$_3$NHCO, n=1).

EXAMPLE 102

Oxidation of 1-[N-(tert-butyl)carbamyl]-1,2,3,5-tetrahydro-4,1-benzothiazepine in the manner of Example 35 affords 1-[N-(tert-butyl)carbamyl]-1,2,3,5-tetrahydro-4,1-benzothiazepine-4-oxide (III: Q=H, Y=(CH$_3$)$_3$CNHCO, n=1).

EXAMPLE 103

Oxidation of 1-(N-ethylthiocarbamyl)-1,2,3,5-tetrahydro-4,1-benzothiazepine in the manner of Example 35 affords 1-(N-ethylthiocarbamyl)-1,2,3,5-tetrahydro-4,1-benzothiazepine-4-oxide (III: Q=H, Y=CH$_3$CH$_2$NHCS, n=1).

EXAMPLE 104

Oxidation of 1-(N-butylthiocarbamyl)-1,2,3,5-tetrahydro-4,1-benzothiazepine in the manner of Example 35 affords 1-(N-butylthiocarbamyl)-1,2,3,5-tetrahydro-4,1-benzothiazepine-4-oxide (III: Q=H, Y=CH$_3$CH$_2$CH$_2$CH$_2$NHCS, n=1).

EXAMPLE 105

Oxidation of 1-(N-phenylcarbamyl)-1,2,3,5-tetrahydro-4,1-benzothiazepine in the manner of Example 35 affords 1-(N-phenylcarbamyl)-1,2,3,5-tetrahydro-4,1-benzothiazepine-4-oxide (III: Q=H, Y=C$_6$H$_{5I}{}^{NHCO}$, n=1).

EXAMPLE 106

Oxidation of 1-(N-phenylthiocarbamyl)-1,2,3,5-tetrahydro-4,1-benzothiazepine in the manner of Example 35 affords 1-(N-phenylthiocarbamyl)-1,2,3,5-tetrahydro-4,1-benzothiazepine-4-oxide (III: Q=H, Y=C$_6$H$_{5I}{}^{NHCS}$, n=1).

EXAMPLE 107

Oxidation of 1-[N-(m-trifluoromethylphenyl)carbamyl]-1,2,3,5-tetrahydro-4,1-benzothiazepine in the manner of Example 35 affords 1-[N-(m-trifluoromethylphenyl)carbamyl]-1,2,3,5-tetrahydro-4,1-benzothiazepine-4-oxide (III: Q=H, Y=m-CF$_3$C$_6$H$_4$NHCO, n=1).

EXAMPLE 108

In a manner similar to Example 44 except that the product crystallized from the reaction solution after dilution with ether, oxidation of 1-carbamyl-1,2,3,5-tetrahydro-4,1- benzothiazepine (10.4 g., 0.0500 mole) gave a solid, recrystallization of which from 95 percent ethanol afforded white crystals of 1-carbamyl-1,2,3,5-tetrahydro-4,1-benzothiazepine-4,4-dioxide (III: Q=H, Y=NH$_2$CO, n=2) (7.8 g., m.p. 238–241°C.).

EXAMPLE 109

Oxidation of 7-methoxy-1-carbamyl-1,2,3,5-tetrahydro-4,1-benzothiazepine in the manner of Example 44 affords 7-methoxy-1-carbamyl-1,2,3,5-tetrahydro-4,1-benzothiazepine-4,4-dioxide (III: Q=7-CH$_3$O, Y=NH$_2$CO, n=2).

EXAMPLE 110

Oxidation of 1-thiocarbamyl-1,2,3,5-tetrahydro-4,1-benzothiazepine in the manner of Example 44 affords 1-thiocarbamyl-1,2,3,5-tetrahydro-4,1-benzothiazepine-4,4-dioxide (III: Q=H, Y=NH$_2$CS, n=2).

EXAMPLE 111

Oxidation of 1-(N-methylcarbamyl)-1,2,3,5-tetrahydro-4,1-benzothiazepine in the manner of Example 44 affords 1-(N-methylcarbamyl)-1,2,3,5-tetrahydro-4,1-benzothiazepine-4,4-dioxide (III: Q=H, Y=CH$_3$NHCO, n=2).

EXAMPLE 112

Oxidation of 1-[N-(tert-butyl)carbamyl]-1,2,3,5-tetrahydro-4,1-benzothiazepine in the manner of Example 44 affords 1-[N-(tert-butyl)carbamyl]-1,2,3,5-tetrahydro-4,1-benzothiazepine-4,4-dioxide (III: Q=H, Y=(CH$_3$)$_3$CNHCO, n=2).

EXAMPLE 113

Oxidation of 1-(N-ethylthiocarbamyl)-1,2,3,5-tetrahydro-4,1-benzothiazepine in the manner of Example 44 affords 1-(N-ethylthiocarbamyl)-1,2,3,5-tetrahydro-4,1-benzothiazepine-4,4-dioxide (III: Q=H, Y=CH$_3$CH$_2$NHCS, n=2).

EXAMPLE 114

Oxidation of 1-(N-butylthiocarbamyl)-1,2,3,5-tetrahydro-4,1-benzothiazepine in the manner of Example 44 affords 1(N-butylthiocarbamyl)-1,2,3,5-tetrahydro-4,1-benzothiazepine-4,4-dioxide (III: Q=H, Y=CH$_3$CH$_2$CH$_2$CH$_2$NHCS, n=2).

EXAMPLE 115

Oxidation of 1-(N-phenylcarbamyl)-1,2,3,5-tetrahydro-4,1-benzothiazepine in the manner of Example 44 affords 1-(N-phenylcarbamyl)-1,2,3,5-tetrahydro-4,1-benzothiazepine-4,4-dioxide (III: Q=H, Y=C$_6$H$_{BI}^{NHCO}$, n=2).

EXAMPLE 116

Oxidation of 1-(N-phenylthiocarbamyl)-1,2,3,5-tetrahydro-4,1-benzothiazepine in the manner of Example 44 affords 1-(N-phenylthiocarbamyl)-1,2,3,5-tetrahydro-4,1-benzothiazepine-4,4-dioxide (III: Q=H, Y=C$_6$H$_{BI}^{NHCS}$, n=2).

EXAMPLE 117

Oxidation of 1-[N-(m-trifluoromethylphenyl)carbamyl]- 1,2,3,5-tetrahydro-4,1-benzothiazepine-in the manner of Example 44 affords 1-[N-(M-trifluoromethylphenyl)carbamyl]-1,2,3,5-tetrahydro-4,1-benzothiazepine-4,4-dioxide (III: Q=H, Y=m-CF$_3$C$_6$H$_4$NHCO, n=2).

EXAMPLE 118

A solution of sodium nitrite (40.0 g.) in water (100 ml.) was added dropwise with stirring and warming to a solution of 1,2,3,5-tetrahydro-4,1-benzothiazepine (71.0 g., 0.43 mole) in hydrochloric acid (6N, 100 ml.). The resulting mixture was extracted with chloroform (1 × 100 ml., 1 ×150 ml., 1 ×50 ml.). The combined chloroform extracts were washed with sodium carbonate solution (15 percent, 150 ml.) and water (150 ml.), dried over magnesium sulfate and concentrated Recrystallization of the resulting solid (84.9 g.) from ether afforded 1-nitrose-1,2,3,5-tetrahydro-4,1-benzothiazepine (IV: Q=H, Z=NO) in two crops of crystals (70.6 g., m.p. 87–88.5°C.; 7.15 g., m.p. 88°–89 °C.). Part (10.00 g.) of this material was recrystallized from ether (8.35 g., m.p. 88.2°–89°C.).

EXAMPLE 119

By substituting 9-fluoro-1,2,3,5-tetrahydro-4,1-benzothiazepine from Step E of Example 2 for b 1,2,3,5-tetrahydro-4,1-benzothiazepine in Example 118, 9-fluoro-1-nitroso-1,2,3,5-tetrahydro-4,1-benzothiazepine (IV: Q=9-F, Z=NO) is obtained.

EXAMPLE 120

By substituting 8-chloro-1,2,3,5-tetrahydro-4,1-benzothiazepine from Step E of Example 3 for 1,2,3,5-tetrahydro-4,1-benzothiazepine in Example 118, 8-chloro-1-nitroso-1,2,3,5-tetrahydro-4,1-benzothiazepine (IV: Q=8-Cl, Z=NO) is obtained.

EXAMPLE 121

By substituting 7-bromo-1,2,3,5-tetrahydro-4,1-benzothiazepine from Step E of Example 4 for 1,2,3,5-tetrahydro-4,1-benzothiazepine in Example 118, 7-bromo-1-nitroso-1,2,3,5-tetrahydro-4,1-benzothiazepine (IV: Q=7-Br, Z=NO) is obtained.

EXAMPLE 122

By substituting 6-iodo-1,2,3,5-tetrahydro-4,1-benzothiazepine from Step E of Example 5 for 1,2,3,5-tetrahydro-4,1-benzothiazepine in Example 118, 6-iodo-1-nitroso-1,2,3,5-tetrahydro-4,1-benzothiazepine (IV: Q=6-I, Z=NO) is obtained.

EXAMPLE 123

By substituting 7-methoxy-1,2,3,5-tetrahydro-4,1-benzothiazepine from Step E of Example 6 for 1,2,3,5-tetrahydro-4,1-benzothiazepine in Example 118, 7-methoxy-1-nitroso-1,2,3,5-tetrahydro-4,1-benzothiazepine (IV: Q=7-CH$_3$O, Z=NO) is obtained.

EXAMPLE 124

By substituting 7-isopropoxy-1,2,3,5-tetrahydro-4,1-benzothiazepine from Step E of Example 7 for 1,2,3,5-tetrahydro-4,1-benzothiazepine in Example 118, 7-isopropoxy-1-nitroso-1,2,3,5-tetrahydro-4,1-benzothiazepine (IV: Q=7-(CH$_3$)$_2$CHO, Z=NO) is obtained.

EXAMPLE 125

By substituting 6-trifluoromethyl-1,2,3,5-tetrahydro-4,1-benzothiazepine from Step E of Example 8 for 1,2,3,5-tetrahydro-4,1-benzothiazepine in Example 118, 6-trifluoromethyl-1-nitroso-1,2,3,5-tetrahydro-4,1-benzothiazepine (IV: Q=6-CH$_3$O, Z=NO) is obtained.

EXAMPLE 126

A solution of 1-nitroso-1,2,3,5-tetrahydro-4,1-benzothiazepine (58.2 g., 0.300 mole) in tetrahydrofuran (475 ml). was added dropwise with stirring to a refluxing mixture of lithium aluminum hydride (14.25 g., 0.376 mole) and tetrahydrofuran (250 ml.) during 3 hr. 15 min. Refluxing was continued for 1 hr. The mixture was chilled, treated with a solution of water (35 ml.) and tetrahydrofuran, and heated to reflux. Filtering the mixture, washing the filter cake with hot tetrahydrofuran (2 ×250 ml.) and concentrating the filtrate under reduced pressure afforded 1-amino-1,2,3,5-tetrahydro-4,1-benzothiazepine as a red-brown oil (33.5 g.).

Concentrated hydrochloric acid (3.0 ml.) was added to a solution of part (4.5 g., 0.025 mole) of the red-brown oil in absolute ethanol (25 ml.). The precipitate was collected, washed with ethanol and dried, affording 1-amino-1,2,3,5-tetrahydro-4,1-benzothiazepine hydrochloride (IV: Q=H, Z=NH$_2$·HCl) (2.2 g., m.p. 244°–247°C. with decomposition).

EXAMPLE 127

Reduction of 9-fluoro-1-nitroso-1,2,3,5-tetrahydro-4,1-benzothiazepine in the manner of Example 126 affords 9-fluoro-1-amino-1,2,3,5-tetrahydro-4,1-benzothiazepine hydrochloride (IV: Q=9-F, Z=NH$_2$·HCl).

EXAMPLE 128

Reduction of 8-chloro-1-nitroso-1,2,3,5-tetrahydro-4,1-benzothiazepine in the manner of Example 126 affords 8-chloro-1-amino-1,2,3,5-tetrahydro-4,1-benzothiazepine hydrochloride (IV: Q=8-Cl, Z=NH$_2$·HCl).

EXAMPLE 129

Reduction of 7-bromo-1-nitroso-1,2,3,5-tetrahydro-4,1-benzothiazepine in the manner of Example 126 affords 7-bromo-1-amino-1,2,3,5-tetrahydro-4,1-benzothiazepine hydrochloride (IV: Q=7-Br, Z=NH$_2$·HCl).

EXAMPLE 130

Reduction of 6-iodo-1-nitroso-1,2,3,5-tetrahydro-4,1-benzothiazepine in the manner of Example 126 affords 6-iodo-1-amino-1,2,3,5-tetrahydro-4,1-benzothiazepine hydrochloride (IV: Q=6-I, Z=NH$_2$·HCl).

EXAMPLE 131

Reduction of 7-methoxy-1-nitroso-1,2,3,5-tetrahydro-4,1-benzothiazepine in the manner of Example 126 affords 7-methoxy-1-amino-1,2,3,5-tetrahydro-4,1-benzothiazepine hydrochloride (IV: Q=7-CH$_3$O, Z=NH$_2$·HCl).

EXAMPLE 132

Reduction of 7-isopropoxy-1-nitroso-1,2,3,5-tetrahydro-4,1-benzothiazepine in the manner of Example 126 affords 7-isopropoxy-1-amino-1,2,3,5-tetrahydro-4,1-benzothiazepine hydrochloride (IV: Q=7-(CH$_3$)$_2$CHO, Z=NH$_2$·HCl).

EXAMPLE 133

Reduction of 6-trifluoromethyl-1-nitroso-1,2,3,5-tetrahydro-4,1-benzothiazepine in the manner of Example 126 affords 6-trifuluoromethyl-1-amino-1,2,3,5-tetrahydro-4,1-benzothiazepine hydrochloride (IV: Q=6-CF$_3$, Z=NH$_2$·HCl).

I claim:

1. (6,7,8 or 9)-(Q)-1-(X)-4-(O$_n$)-1,2,3,5-Tetrahydro-4,1-benzothiazepine of the formula

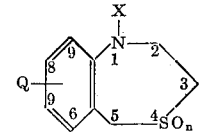

where Q is hydrogen, halo, atertiary alkoxy of one to four carbon atoms or trifluoromethyl; X is alkanoyl of one to five carbon atoms, cycloalkanecarbonyl of three to six ring carbon atoms, phenylalkanoyl of eight to 10 carbon atoms, diphenylalkanoyl of 14 to 16 carbon atoms, atertiary perfluoroalkanoyl of two to five carbon atoms, dibromoacetyl, pentachloro-2,4-pentadienoyl or α,α-diphenyl-α-chloroacetyl; and $n$ is 0, 1 or 2.

2. (6,7,8 or 9)-(Q)-1-(X)-1,2,3,5-Tetrahydro-4,1-benzothiazepine according to claim 1.

3. 1-(X)-1,2,3,5-Tetrahydro-4,1-benzothiazepine according to claim 2.

4. 1-Propionyl-1,2,3,5-tetrahydro-4,1-benzothiazepine according to claim 3.

5. 1-Cyclopropanecarbonyl-1,2,3,5-tetrahydro-4,1-benzothiazepine according to claim 3.

6. 1-β-Phenylpropionyl)-1,2,3,5-tetrahydro-4,1-benzothiazepine according to claim 3.

7. 1-Trifluoroacetyl-1,2,3,5-tetrahydro-4,1-benzothiazepine according to claim 3.

8. 1-Pentafluoropropionyl-1,2,3,5-tetrahydro-4,1-benzothiazepine according to claim 3.

9. 1-Heptafluorobutyryl-1,2,3,5-tetrahydro-4,1-benzothiazepine according to claim 3.

10. 1-Dibromoacetyl-1,2,3,5-tetrahydro-4,1-benzothiazepine according to claim 3.

11. 1-(Pentachloro-2,4-pentadienoyl)-1,2,3,5-tetrahydro-4,1-benzothiazepine according to claim 3.

12. 1-Diphenylchloroacetyl-1,2,3,5-tetrahydro-4,1-benzothiazepine according to claim 3.

13. (6,7,8 or 9)-(Q)-1-(X)-1,2,3,5-Tetrahydro-4,1-benzothiazepine-4-oxide according to claim 1.

14. 1-(X)-1,2,3,5-Tetrahydro-4,1-benzothiazepine-4-oxide according to claim 13.

15. (6,7,8 or 9)-(Q)-1-(X)-1,2,3,5-Tetrahydro-4,1-benzothiazepine-4,4-dioxide according to claim 1.

16. 1-(X)-1,2,3,5-Tetrahydro-4,1-benzothiazepine-4,4-dioxide according to claim 15.

17. 1-Propionyl-1,2,3,5-tetrahydro-4,1-benzothiazepine-4,4-dioxide according to claim 16.

18. 1-Cyclopropanecarbonyl-1,2,3,5-tetrahydro-4,1-benzothiazepine-4,4-dioxide according to claim 16.

19. 1-Pentafluoropropionyl-1,2,3,5-tetrahydro-4,1-benzothiazepine-4,4-dioxide according to claim 16.

20. 1-Heptafluorobutyryl-1,2,3,5-tetrahydro-4,1-benzothiazepine-4,4-dioxide according to claim 16.

21. 1-Dibromoacetyl-1,2,3,5-tetrahydro-4,1-benzothiazinepine-4,4-dioxide according to claim 16.

22. 1,1'-(X')-bis[(6,7,8 or 9)-(Q)-4-$(O_n)$-1,2,3,5-Tetra-hydro-4,1-benzothiazepine] of the formula

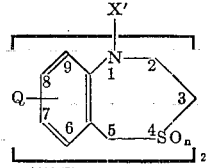

where Q is hydrogen, halo, atertiary alkoxy of one to four carbon atoms or trifluoromethyl; X' is alkanedioyl of three to six chain carbon atoms, perfluorosuccinyl or perfluoroglutaryl; and $n$ is 0, 1, or 2.

23. 1,1-(X')-bis[(6,7,8 or 9)-(Q)-1,2,3,5-Tetrahydro-4,1-benzothiazepine] according to claim 22.

24. 1,1'-(X')-bis(1,2,3,5-Tetrahydro-4,1-benzothiazepine) according to claim 23.

25. 1,1'-Hexafluoroglutarylbis(1,2,3,5-tetrahydro-4,1-benzothiazepine) according to claim 24.

26. 1,1'-(X')-bis[(6,7,8 or 9)-(Q)-1,2,3,5-Tetrahydro-4,1-benzothiazepine-4-oxide] according to claim 22.

27. 1,1'-(X')-bis[1,2,3,5-Tetrahydro-4,1-benzothiazepine-4-oxide] according to claim 26.

28. 1,1'-(X')-bis[(6,7,8 or 9)-(Q)-1,2,3,5-Tetrahydro-4,1-benzothiazepine-4,4-dioxide according to claim 22.

29. 1,1'(X')bis[1,2,3,5-Tetrahydro-4,1-benzothiazepine-4,4-dioxide] according to claim 28.

30. (6,7,8 or 9)-(Q)-1-(Y)-4-$(O_n)$-1,2,3,5-Tetrahydro-4,1-benzothiazepine of the formula

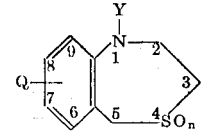

where Q is hydrogen, halo, atertiary alkoxy of one to four carbon atoms or trifluoromethyl; Y is thiocarbamyl, N-alkylcarbamyl or N-alkylthiocarbamyl of two to five carbon atoms, N-phenylcarbamyl, N-phenylthoicarbamyl or N-phenylcarbamyl or N-phenylthiocarbamyl substituted in the benzene ring by one to three members of the group consisting of methyl, trifluoromethyl, halo, methoxy, acetamido, nitro and methylmercapto; and $n$ is 0, 1 or 2.

31. (6,7,8 or 9)-(Q)-1-(Y)-1,2,3,5-Tetrahydro-4,1-benzothiazepine according to claim 30.

32. 1-(Y)-1,2,3,5-Tetrahydro-4,1-benzothiazepine according to claim 31.

33. (6,7,8 or 9)-(Q)-1-(Y)-1,2,3,5-Tetrahydro-4,1-benzothiazepine-4-oxide according to claim 30.

34. 1(Y)-1,2,3,5-Tetrahydro-4,1-benzothiazepine-4-oxide according to claim 33.

35. (6,7,8 or 9)-(Q)-1-(Y)-1,2,3,5-Tetrahydro-4,1-benzothiazepine-4,4-dioxide according to claim 30.

36. 1-(Y)-1,2,3,5-Tetrahydro-4,1-benzothiazepine-4,4-dioxide according to claim 35.

37. (6,7,8 or 9)-(Q)-1-(Z)-1,2,3,5-Tetrahydro-4,1-benzothiazepine of the formula

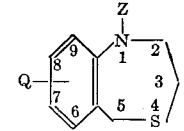

where Q is hydrogen, halo, atertiary alkoxy of one to four carbon atoms or trifluoromethyl; and Z is nitroso or amino.

38. (6,7,8 or 9)-(Q)-1-Nitroso-1,2,3,5-tetrahydro-4,1-benzothiazepine according to claim 37.

29. 1-Nitroso-1,2,3,5-tetrahydro-4,1-benzothiazepine according to claim 38.

40. (6,7,8 or 9)-(Q)-1-Amino-1,2,3,5-tetrahydro-4,1-benzothiazepine according to claim 37.

41. 1-Amino-1,2,3,5-tetrahydro-4,1-benzothiazepine according to claim 40.

* * * * *